US007593324B2

(12) United States Patent
Jain et al.

(10) Patent No.: US 7,593,324 B2
(45) Date of Patent: Sep. 22, 2009

(54) GRACEFUL PORT SHUTDOWN PROTOCOL FOR FIBRE CHANNEL INTERFACES

(75) Inventors: Praveen Jain, San Jose, CA (US); Ranganathan Rajagopalan, Fremont, CA (US); Ramsundar Janakiraman, Sunnyvale, CA (US); Shashank Gupta, San Jose, CA (US); Sachin Jain, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 581 days.

(21) Appl. No.: 10/974,368

(22) Filed: Oct. 25, 2004

(65) Prior Publication Data

US 2006/0087963 A1    Apr. 27, 2006

(51) Int. Cl.
*H04L 12/26* (2006.01)
(52) U.S. Cl. .......................... 370/227; 370/228; 714/24
(58) Field of Classification Search ................. 370/216, 370/217, 225, 227, 228; 714/1–4, 24; 709/223–226
See application file for complete search history.

(56) References Cited

U.S. PATENT DOCUMENTS

| | | | |
|---|---|---|---|
| 5,428,471 A * | 6/1995 | McDermott | ................. 398/181 |
| 5,506,838 A | 4/1996 | Flanagan | |
| 5,617,421 A | 4/1997 | Chin et al. | |
| 5,675,741 A | 10/1997 | Aggarwal et al. | |
| 5,682,479 A | 10/1997 | Newhall et al. | |
| 5,708,659 A | 1/1998 | Rostoker et al. | |
| 5,740,159 A | 4/1998 | Ahmad et al. | |
| 5,740,171 A | 4/1998 | Mazzola et al. | |
| 5,742,604 A | 4/1998 | Edsall et al. | |
| 5,764,636 A | 6/1998 | Edsall | |
| 5,809,285 A | 9/1998 | Hilland | |
| 5,818,603 A | 10/1998 | Motoyama | |
| 5,819,112 A | 10/1998 | Kusters | |
| 5,862,125 A | 1/1999 | Russ | |
| 5,959,972 A | 9/1999 | Hamami | |
| 5,959,990 A | 9/1999 | Frantz et al. | |
| 5,964,841 A | 10/1999 | Rekhter | |
| 5,999,930 A | 12/1999 | Wolff | |

(Continued)

FOREIGN PATENT DOCUMENTS

EP    0772121 A    5/1997

(Continued)

OTHER PUBLICATIONS http://t11.org/index.htm, Fabric Shortest Path First (FSPF) Project 1508-D Switch Fabric -3 Rev. 6.5, Oct. 31, 2003, pp. 117-140.

(Continued)

*Primary Examiner*—Min Jung
(74) *Attorney, Agent, or Firm*—Weaver Austin Villeneuve & Sampson LLP

(57) ABSTRACT

A port shutdown protocol coordinates among various components involved in the process of administratively bringing down a link at both ends of a link connecting two switches. Execution of the protocol avoids or reduces frame drops and/or reordering. In this protocol, peer switches perform various actions when bringing down an ISL in a synchronized manner. In one implementation, this protocol uses the Exchange Peer Protocol (EPP) as the underlying transport to carry the port shutdown protocol frames.

37 Claims, 6 Drawing Sheets

U.S. PATENT DOCUMENTS

| | | | |
|---|---|---|---|
| 6,035,105 A | 3/2000 | McCloghrie et al. | |
| 6,046,985 A | 4/2000 | Aldred | |
| 6,101,497 A | 8/2000 | Ofek | |
| 6,160,813 A | 12/2000 | Banks et al. | |
| 6,188,668 B1 * | 2/2001 | Brewer et al. | 370/222 |
| 6,188,694 B1 | 2/2001 | Fine et al. | |
| 6,202,135 B1 | 3/2001 | Kedem et al. | |
| 6,205,488 B1 | 3/2001 | Casey et al. | |
| 6,208,623 B1 | 3/2001 | Rochberger et al. | |
| 6,208,649 B1 | 3/2001 | Kloth | |
| 6,209,059 B1 | 3/2001 | Ofer et al. | |
| 6,219,699 B1 | 4/2001 | McCloghrie et al. | |
| 6,226,771 B1 | 5/2001 | Hilla et al. | |
| 6,243,358 B1 | 6/2001 | Monin | |
| 6,260,120 B1 | 7/2001 | Blumenau et al. | |
| 6,262,977 B1 | 7/2001 | Seaman et al. | |
| 6,266,705 B1 | 7/2001 | Ullum et al. | |
| 6,269,381 B1 | 7/2001 | St. Pierre et al. | |
| 6,269,431 B1 | 7/2001 | Dunham | |
| 6,295,296 B1 | 9/2001 | Tappan | |
| 6,295,575 B1 | 9/2001 | Blumenau et al. | |
| 6,330,614 B1 | 12/2001 | Aggarwal et al. | |
| 6,337,861 B1 | 1/2002 | Rosen | |
| 6,388,995 B1 | 5/2002 | Gai et al. | |
| 6,408,001 B1 | 6/2002 | Chuah et al. | |
| 6,426,952 B1 | 7/2002 | Francis et al. | |
| 6,438,612 B1 | 8/2002 | Ylonen et al. | |
| 6,473,421 B1 | 10/2002 | Tappan | |
| 6,493,349 B1 | 12/2002 | Casey | |
| 6,529,963 B1 | 3/2003 | Fredin et al. | |
| 6,532,212 B1 | 3/2003 | Soloway et al. | |
| 6,597,663 B1 | 7/2003 | Rekhter | |
| 6,604,407 B2 | 8/2003 | Kano | |
| 6,643,287 B1 | 11/2003 | Callon et al. | |
| 6,661,773 B1 | 12/2003 | Pelissier et al. | |
| 6,674,760 B1 | 1/2004 | Walrand et al. | |
| 6,728,220 B2 | 4/2004 | Behzadi | |
| 6,728,848 B2 | 4/2004 | Tamura et al. | |
| 6,766,482 B1 | 7/2004 | Yip et al. | |
| 6,775,230 B1 | 8/2004 | Watanabe et al. | |
| 6,804,776 B1 | 10/2004 | Lothberg et al. | |
| 6,848,007 B1 | 1/2005 | Reynolds et al. | |
| 6,859,435 B1 | 2/2005 | Lee et al. | |
| 6,879,560 B1 | 4/2005 | Cahn | |
| 6,904,053 B1 | 6/2005 | Berman | |
| 6,915,358 B2 | 7/2005 | Horton et al. | |
| 6,920,133 B1 | 7/2005 | Boodaghians | |
| 6,920,153 B2 | 7/2005 | Ellis et al. | |
| 6,920,154 B1 | 7/2005 | Achler | |
| 6,947,379 B1 | 9/2005 | Gleichauf et al. | |
| 6,959,151 B1 | 10/2005 | Cotter et al. | |
| 6,975,589 B2 | 12/2005 | Luft et al. | |
| 6,985,490 B2 | 1/2006 | Czeiger et al. | |
| 7,006,525 B1 | 2/2006 | Jha | |
| 7,026,288 B2 | 4/2006 | Judice et al. | |
| 7,027,406 B1 | 4/2006 | Shabtay et al. | |
| 7,046,679 B2 | 5/2006 | Sampath | |
| 7,050,392 B2 * | 5/2006 | Valdevit | 370/228 |
| 7,061,858 B1 | 6/2006 | Di Benedetto et al. | |
| 7,072,298 B2 | 7/2006 | Paul et al. | |
| 7,079,544 B2 | 7/2006 | Wakayama et al. | |
| 7,082,140 B1 | 7/2006 | Hass | |
| 7,085,846 B2 | 8/2006 | Jenne et al. | |
| 7,155,494 B2 | 12/2006 | Czeiger et al. | |
| 7,161,935 B2 | 1/2007 | Alonso et al. | |
| 7,206,288 B2 | 4/2007 | Cometto et al. | |
| 7,221,652 B1 | 5/2007 | Singh et al. | |
| 7,275,103 B1 | 9/2007 | Thrasher et al. | |
| 7,301,898 B1 | 11/2007 | Martin et al. | |
| 7,302,494 B2 | 11/2007 | Hayashi et al. | |
| 7,319,669 B1 | 1/2008 | Kunz et al. | |
| 7,328,260 B1 | 2/2008 | Muthiyan et al. | |
| 7,330,892 B2 | 2/2008 | Ibrahim | |
| 7,376,755 B2 | 5/2008 | Pandya | |
| 7,443,799 B2 | 10/2008 | Varanasi et al. | |
| 7,447,224 B2 | 11/2008 | Dropps | |
| 2001/0049739 A1 | 12/2001 | Wakayama | |
| 2002/0009081 A1 | 1/2002 | Sampath et al. | |
| 2002/0075873 A1 * | 6/2002 | Lindhorst-Ko et al. | 370/394 |
| 2002/0085493 A1 * | 7/2002 | Pekkala et al. | 370/235 |
| 2002/0101868 A1 | 8/2002 | Clear et al. | |
| 2002/0110125 A1 | 8/2002 | Banks et al. | |
| 2002/0133740 A1 * | 9/2002 | Oldfield et al. | 714/6 |
| 2002/0150039 A1 * | 10/2002 | Valdevit | 370/216 |
| 2002/0152338 A1 | 10/2002 | Elliott et al. | |
| 2002/0156918 A1 | 10/2002 | Valdevit et al. | |
| 2002/0156924 A1 | 10/2002 | Czeiger et al. | |
| 2002/0159463 A1 * | 10/2002 | Wang | 370/401 |
| 2002/0176434 A1 | 11/2002 | Yu et al. | |
| 2002/0188754 A1 | 12/2002 | Foster et al. | |
| 2003/0012204 A1 | 1/2003 | Czeiger et al. | |
| 2003/0016624 A1 | 1/2003 | Bare | |
| 2003/0101239 A1 | 5/2003 | Ishizaki | |
| 2003/0107987 A1 * | 6/2003 | Kinstler | 370/228 |
| 2003/0118053 A1 | 6/2003 | Gai et al. | |
| 2003/0145116 A1 | 7/2003 | Moroney et al. | |
| 2003/0149848 A1 | 8/2003 | Ibrahim et al. | |
| 2003/0163727 A1 | 8/2003 | Hammons et al. | |
| 2003/0189929 A1 | 10/2003 | Matsuzaki et al. | |
| 2003/0198247 A1 * | 10/2003 | Gardner et al. | 370/445 |
| 2003/0225875 A1 * | 12/2003 | Revanuru et al. | 709/223 |
| 2004/0100910 A1 | 5/2004 | Desai et al. | |
| 2004/0151174 A1 | 8/2004 | Del Signore et al. | |
| 2004/0151188 A1 | 8/2004 | Maveli et al. | |
| 2004/0230787 A1 | 11/2004 | Blumenau et al. | |
| 2004/0233921 A1 | 11/2004 | Krieg et al. | |
| 2005/0018606 A1 | 1/2005 | Dropps | |
| 2005/0018663 A1 * | 1/2005 | Dropps et al. | 370/360 |
| 2005/0018701 A1 | 1/2005 | Dropps | |
| 2005/0036499 A1 | 2/2005 | Dutt et al. | |
| 2005/0080903 A1 * | 4/2005 | Valenci | 709/227 |
| 2005/0088969 A1 | 4/2005 | Carlsen et al. | |
| 2005/0108444 A1 | 5/2005 | Flauaus | |
| 2005/0117562 A1 | 6/2005 | Wrenn | |
| 2005/0177634 A1 * | 8/2005 | Scudder et al. | 709/225 |
| 2005/0249123 A1 * | 11/2005 | Finn | 370/242 |
| 2005/0267965 A1 * | 12/2005 | Heller | 709/224 |
| 2006/0034302 A1 | 2/2006 | Peterson | |
| 2006/0038263 A1 | 2/2006 | Eigner et al. | |
| 2006/0092932 A1 | 5/2006 | Ghosh et al. | |
| 2006/0117212 A1 * | 6/2006 | Meyer et al. | 714/4 |
| 2006/0153186 A1 | 7/2006 | Bector et al. | |
| 2006/0159081 A1 | 7/2006 | Dropps | |
| 2007/0153816 A1 | 7/2007 | Cometto et al. | |
| 2008/0028096 A1 | 1/2008 | Henderson et al. | |
| 2008/0316942 A1 | 12/2008 | Desai et al. | |

FOREIGN PATENT DOCUMENTS

| | | |
|---|---|---|
| EP | 1134938 | 9/2001 |
| EP | 1187406 | 3/2002 |
| JP | 2-209044 | 8/1990 |
| JP | 10-293633 | 11/1998 |
| JP | 2000-22699 | 2/2000 |
| JP | 2001-154929 | 6/2001 |
| JP | 2001-320420 | 11/2001 |
| JP | 2001-345865 | 12/2001 |
| WO | WO 00/31925 | 6/2000 |
| WO | WO01/19027 | 3/2001 |
| WO | WO 01/95565 | 12/2001 |

| WO | WO 02/071224 | 12/2002 |

OTHER PUBLICATIONS

Cisco Systems, "Cisco SAN-OS", 1992-2004 Cisco Systems, Inc. pp. 1-13.
Cisco Systems, "Cisco MDS 9000 Family of Multilayer Directors and Fabric Switches", 1992-2003 Cisco Systems, Inc., pp. 1-4.
DeSanti et al., "Tagged Frame Specification," Tagged Frame Spec., T11/03-353v0, May 2003, 4 pages.
Claudio DeSanti, "Virtual Fabrics", T11/03-220v0, PowerPoint presentation, Apr. 2003, 11 pages.
Int'l Search Report for PCT Application No. PCT/US03/36452, mailed Jul. 12, 2004.
PCT International Search Report, PCT/US02/41072, mailed May 23, 2003, 5 pages.
Armitage, Grenville, "MPLS: The Magic Behind the Myths," Jan. 2000, *IEEE Communications Magazine*, pp. 124-131.
Claudio DeSanti, "Virtual Fabrics N_Port Support", VF N_Support, T11/04-49v0, Jul. 2004, 13 pages.
Claudio DeSanti, "Extended_Headers", VF N_Port Model, T11/04-627v1, Oct. 2004, 1 page.
Claudio DeSanti, "Virtual Fabrics Switch Support," VF Switch Support, T11/04-395v3, Oct. 2004, 15 pages.
Claudio DeSanti, "Virtual Fabrics N_Port Support", VF N_Port Support, T11/04-494v2, Oct. 2004, 14 pages.
Ezio Valdevit, http://t11.org/index.htm, Fabric Shortest Path First Version 2 (FSPF) Version 0.2, May 23, 2000.
PCT International Search Report dated Oct. 25, 2006; App.#PCT/US05/37763 (CISCP396WO).
PCT Written Opinion dated Oct. 25, 2006; App.#PCT/US05/37763 (CISCP396WO).
Brocade Communication Systems, Inc. (2002-2003), "Optimizing the performance and management of 2Gbit/sec SAN fabrics with ISL trunking," White Paper (webprint).
Brocade Communication Systems, Inc. (Jun. 2001), "Increasing Intelligence with the SAN Fabric," White Paper (webprint), XP002251362.
Cisco Systems, Inc. (1992-2003), "Cisco SAN-OS," pp. 1-7.
Cisco Systems, Inc. (1992-2004), "Cisco SAN-OS Reference Guide," pp. 1-13.
Cometto et al. (Apr. 1, 2002), "Methods and Apparatus for Fibre Channel Frame Delivery," U.S. Appl. No. 10/114,568 (ANDIP008).
Desanti (Apr. 2003), "Virtual Fabrics," T11/03-220v0, 11 pages (Microsoft PowerPoint presentation).
Guan et al., Inter-fabric FC Architecture, May 30, 2003, Brocade—The Intelligent Platform for Network Storage.
Lee et al. (4/12002), "Label Switching in Fibre Channel Networks," U.S. Appl. No. 10/114,394 (ANDIP009).
Listanti et al. (Sep. 2000), "Architectural and Technological Issues for Future Optical Internet Networks," Optical Solutions for Next-Generation Internet Networks, IEEE Communication Magazine.
Mearian et al., "Whats's After Fibre Channel?", Computerworld, Online!, Oct. 15, 2001, XP002246206.
Mills (Jul. 1988), "Network Working Group Request for Comments 1059, Network Time Protocol (Version 1) Specification and Implementation," University of Delaware, pp. 1-50.
Molero et al. (Dec. 7-9, 2000), "On the effect of link failure in fibre channel sotrage area networks," Parallel Architectures, Algorithms and Networks 2000, I-Span 2000 Proceedings, Int'l Symposium.
Monia (Dec. 12, 2000), "iFCP- A Protocol for Internet Fibre Channel Storage Networking" Nishan Systems (webprint), P002246205.
Monia et al. (Feb. 2002), "iFCP—A Protocol for Internet Fibre Channel Storage Networking."
NCITS (Nov. 28, 2000), "Fibre Channel Generic Services-3 (FC-GS-3)," working draft.
NCITS (Feb. 19, 2003), "Fibre Channel Switch Fabric-3 (FC-SW-3)," working draft (XP002300830 (A)).
NCITS (Feb. 19, 2003), "Fibre Channel Switch Fabric-3 (FC-SW-3)," working draft (XP002300830(B)).
NCITS (Feb. 19, 2003), "Fibre Channel Switch Fabric-3 (FC-SW-3)," working draft (XP002300830(C)).
NCITS (Jun. 26, 2001), "Fibre Channel Switch Fabric-2 (FC-SW-2)." working draft.
Rajagopal et al. (Jun. 30, 1999), "IP and ARP Over Fibre Channel," Request for Comments: 2625 (webprint), XP002246207.
Rangan (Sep. 4, 2001), "Re: FCIP/1FCP: Gurantee In-Order delivery for FC N/NL_ports," IP Storage—Mailing List Archive http://www.pdl.cmu/edu/mailinglists/ips/mail/msg03069.html webprint).
Rosen et al. (Jan. 2001), "Multiprotocol Label Switching Architecture," Network Working Group, RFC 3031, XP002251364.
White (Sep. 2000), RFC 2925, IBM Corp.
AU Office Action (Mar. 16, 2007) from AU Patent Application No. 2002364204 (ANDIP001.AU).
AU Office Action dated May 30, 2007 from AU Patent Application No. 2003226022 (ANDIP008.AU).
AU Office Action (May 23, 2007) from AU Patent Application No. 2003226093 (ANDIP009.AU).
CA Office Action (Nov. 15, 2006) from CA Patent Application No. 2487071 (ANDIP011.CA).
CN Office Action (Sep. 8, 2006) from CN Patent Application No. 03807600.4 (ANDIP009.CN).
CN Office Action (Oct. 19, 2007) from CN Patent Application No. 200480010826.0 (ANDIP031.CN).
EP Search Report (Feb. 10, 2006) from EP Patent Application No. 03746053.2 -2416 (ANDIP008.EP).
EP Office Action (Mar. 28, 2007) from EP Patent Application No. 03746053.2—2416 (ANDIP008.EP).
EP Office Action (Oct. 1, 2007) from EP Patent Application No. 03746053.2—2416 (ANDIP008.EP).
EP Search Report (May 19, 2005) from EP Patent Application No. 03746062.3 -1249 (ANDIP009.EP).
EP Office Action (Apr. 5, 2006) from EP Patent Application No. 03739 127.3—2416 (ANDIP011.EP).
EP Office Action (Nov. 6, 2007) from EP Patent Application No. 03789766.7 (ANDIP025.EP).
US Office Action (May 31, 2006) from U.S. Appl. No. 10/034,160 (ANDIP001).
US Office Action (Jul. 30, 2007) from U.S. Appl. No. 10/034,160 (ANDIP001).
US Office Action (Aug. 22, 2005) from US Patent Application No. 10/034,160 (ANDIP001).
US Office Action (Sep. 26, 2006) from U.S. Appl. No. 10/034,160 (ANDIP001).
US Office Action (Dec. 13, 2005) from U.S. Appl. No. 10/034,160 (ANDIP001).
US Office Action (Feb. 5, 2007) from U.S. Appl. No. 10/034,160 (ANDIP001).
US Office Action (May 22, 2006) from U.S. Appl. No. 10/114,568 (ANDIP008).
US Office Action (Oct. 23, 2006) from U.S. Appl. No. 10/114,568 (ANDIP008).
US Office Action (Apr. 6, 2007) from U.S. Appl. No. 10/114,568 (ANDIP008).
US Office Action (Sep. 20, 2007) from U.S. Appl. No. 10/114,568 (ANDIP008).
US Office Action (Apr. 4, 2007) from U.S. Appl. No. 10/114,394 (ANDIP009).
US Office Action (Oct. 17, 2006) from U.S. Appl. No. 10/114,394 (ANDIP009).
US Office Action (Aug. 22, 2007) from U.S. Appl. No. 10/114,394 (ANDIP009).
US Office Action (May 22, 2006) from U.S. Appl. No. 10/170,855 (ANDIP011).
Allowed Claims for U.S. Appl. No. 10/170,855 (ANDIP011).
US Notice of Allowance and Notice of Allowability (Dec. 6, 2006) from U.S. Appl. No. 10/170,855 (ANDIP011).
US Office Action (Feb. 23, 2007) from U.S. Appl. No. 10/430,491 (ANDIP025).
US Office Action (Aug. 9, 2007) from U.S. Appl. No. 10/430,491 (ANDIP025).
US Notice of Allowance and Notice Allowability (Nov. 23, 2007) from U.S. Appl. No. 10/430,491 (ANDIP025).
US Office Action (Mar. 28, 2007) from U.S. Appl. No. 10/609,442 (ANDIP031).

US Office Action (Mar. 28, 2007) from U.S. Appl. No. 10/791,143 (ANDIP031A).
US Office Action (Oct. 29, 2007) from U.S. Appl. No. 11/027,252.
WO Search Report (Oct. 17, 2003) from International Patent Application No. PCT/US03/09328 (ANDIP008.WO).
WO Search Report (Jul. 15, 2003) from International Patent Application No. PCT/US03/09442 (ANDIP009.WO).
WO Search Report (Nov. 4, 2003) from International Patent Application No. PCT/US03/18765 (ANDIP011.WO).
WO Search Report (Oct. 27, 2004) from International Patent Application No. PCT/US2004/020518 (ANDIP031.WO).
WO Search Report (Oct. 25, 2006) from International Patent Application No. PCT/US05/37763.
WO Written Opinion (Oct. 25, 2006) from International Patent Application No. PCT/US05/37763.
Office Action dated May 2, 2008 for Japanese Patent Application No. 2003-582964.
D1: Yasumori Takizawa, "Technology Scope IP Storage Disk Divided by IP Network Wide Area Ethernet Encouraging the Same," *Nikkei Communication*, Mar. 4, 200, No. 361, pp. 106-113. (Reference cited in office action).
D2: Glenn Sullivan, "Building of Long Distance SAN", *UNIX Magazine*, Apr. 1, 2000, vol. 15, No. 4, pp. 133-137. (Reference cited in office action).
D3: Fujita et al., "SSE98-225 QoS Control Using MPLS over ATM," *Technical Report of IECE*, Mar. 19, 1999, vol. 98, No. 668, pp. 81-86.
Examination Report dated Jul. 14, 2008 from Australian Patent Application No. 2003296301.
ATM Forum Committee, Chapter 10, "Flush Message Protocol Procedures and Frame Formats," Lan Emulation Over ATM Version 2—LUNI Specification, AF-Lane-0084.000, Jul. 1997, pp. 111-115.
White Paper, Link Aggregation According to IEEE Standard 802.3ad, Oct. 10, 2002, v.1.10, pp. 1-21.
Kiiskilä, Marko, "Implementation of LAN Emulation of ATM in Linux," Tampereen Teknillinen Korkeakoulu, Oct. 1996, 57 pages.
IEEE Std 802.3-2002, Chapter 43.5 Marker Protocol, Part 3: Carrier Sense Multiple Access with Collision Detection (CSMA/CD) Access Method and Physical Layer Specifications, 2002, pp. 329-345.
U.S. Final Office Action dated Jan. 29, 2008 from related U.S. Appl. No. 10/034,160.
U.S. Appl. No. 10/114,568, Notice of Allowance mailed Mar. 26, 2008.
U.S. Appl. No. 10/114,568, Allowed claims.
Final Office Action mailed Apr. 4, 2007 from related U.S. Appl. No. 10/114,394.
U.S. Appl. No. 10/114,394, Office Action mailed Feb. 6, 2008.
NOA for U.S. Appl. No. 10/430,491 dated Apr. 23, 2008.
U.S. Office Action U.S. Appl. No. 10/609,442, mailed Mar. 28, 2007.
U.S. Final Office Action U.S. Appl. No. 10/609,442, mailed Sep. 5, 2007.
U.S. Office Action U.S. Appl. No. 10/609,442, mailed Mar. 28, 2008.
US Office Action dated May 13, 2008 in related U.S. Appl. No. 10/979,886.
EP Office Action dated Jan. 18, 2005 from related EP Application No. 02799279.1-1525.
EP Office Action dated Oct. 18, 2005 from related EP Application No. 02799279.1-1525.
EP Office Action dated Feb. 20, 2006 from related EP Application No. 02799279.1-1525.
Australian Office Action dated Oct. 4, 2007 from related Australian Application No. 2003245492.
China Office Action issued Dec. 1, 2006 from related China Application No. 02828262.0.
China Office Action dated Mar. 7, 2008 from related China Application No. 03807560.1.
China Office Action dated Jun. 22, 2007 from related China Application No. 03813264.8.
Japanese Application No. 2003-559086, Office Action dated May 19, 2008.
Japanese Application No. 2003-582973, Office Action dated Jun. 2, 2008.
U.S. Appl. No. 10/114,394, Final Office Action mailed Aug. 21, 2008.
Notice of Allowance for U.S. Appl. No. 10/430,491 dated Aug. 8, 2008.
Supplemental Notice of Allowance for U.S. Appl. No. 10/430,491 dated Aug. 26, 2008.
Allowed Claims for U.S. Patent Appl. No. 10/430,491.
U.S. Appl. No. 11/027,252, Final Office Action mailed Aug. 7, 2008.
CN Office Action 200580034140.X dated Jun. 6, 2008.
USPTO Notice of Allowance U.S. Appl. No. 10/609,442, mailed Sep. 26, 2008.
US Office Action dated Nov. 25, 2008 in related U.S. Appl. No. 10/979,886.
Office Action mailed Dec. 12, 2008 for U.S. Appl. No. 11/027,252.
Japanese Application No. 2003-582973, Final Office Action dated Dec. 22, 2008.
Canadian Office Action dated Aug. 13, 2008 from related CA Application No. 2,472,056, 2 pgs.
Office Action issued on Sep. 5, 2008 for CN Patent Application No. 200380104466.6.
U.S. Office Action dated Nov. 19, 2008 from U.S. Appl. No. 10/034,160.
Office Action issued on Dec. 26, 2008 for CN Patent Application No. 03807560.1.
U.S. Office Action dated Nov. 25, 2008 from U.S. Appl. No. 10/979,886.
Office Action issued on Aug. 13, 2008 for Canadian Patent Application No. 2,480,462.
Office Action issued on Jun. 22, 2007 for Chinese Patent Application No. 03813264.8.
U.S. Appl. No. 12/343,843 filed on Dec. 24, 2008.
Office Action issued on Jan. 30, 2008 for Canadian Patent Application No. 2,480,461.
Office Action for CN Patent Application No. 200480010826.0, dated Nov. 7, 2008.
Office Action for CA Patent Application No. 2,521,463 dated Sep. 24, 2008.

* cited by examiner

EPP graceful port shutdown exchange for VSAN removal for a TE Port
(Single Physical Link or Port Channel)

GRACEFUL PORT SHUTDOWN PROTOCOL FOR FIBRE CHANNEL INTERFACES

CROSS REFERENCE TO RELATED APPLICATIONS

This application is related to U.S. patent application Ser. No. 10/430,491, (U.S. Publication No. US-2004-0100910-A1, published May 27, 2004), filed May 5, 2003 and titled METHODS AND DEVICES FOR EXCHANGING PEER PARAMETERS BETWEEN NETWORK DEVICES, by Desai et al., which is incorporated herein by reference for all purposes.

FIELD OF INVENTION

This invention pertains to Fibre Channel networks and the devices and methods implemented therein. More specifically, the invention pertains to devices and methods for gracefully shutting down a Fibre Channel link after learning or deciding that the link should go down.

BACKGROUND

The fiber channel standard incorporates a buffer-to-buffer flow control mechanism to avoid frame drops in the network. Many devices are not designed to work properly if frames are dropped or re-ordered when the flow of data traffic is disrupted. Therefore the recovery process is often tedious and costly. Such traffic disruption may occur in many ways, including link failure, administrative shutdown of interfaces, configuration of interfaces, etc. For a link failure physical event, frame drops are likely unavoidable. However, for administrative actions that cause a link to shut down, it may be possible to bring down the link gracefully so that frame drops or re-ordering can be avoided or reduced to acceptable levels. In the current art, however, this feature is not available and even when a network link is down as a result of a planned administrative action, the process is not graceful and many packets may be lost.

One type of fiber channel link where the problem can arise is an inter-switch link (ISL) connecting two switches. When an ISL is being brought down, associated activities may be performed in any order and generally without coordination of the two switches connected by the ISL. As a result frames may be unnecessarily dropped or re-ordered.

A further problem arises because a finite amount of time is required to inform the affected switches on a network fabric that a particular link has gone down. In the time it takes this information to reach to the relevant switches and be acted upon, the switches may forward multiple frames to the downed link. A switch on link may actually attempt to forward received frames on the downed link simply because the switch has not had ample opportunity to update its internal frame forwarding table to account for the network disruption. Further, at the time the link goes down there may be multiple frames queued in the switch buffer on the link. In an attempt to send those frames over the link, they may be dropped.

What is needed is a protocol and associated apparatus for gracefully shutting down a Fibre Channel link when it is known ahead of time that the link will be going down.

SUMMARY

The present invention addresses this need by providing a graceful port shutdown protocol that synchronizes actions between peer switches on a link. The synchronization ensures that peers take certain actions in concert before actually bringing down the link. A specialized parameter exchange protocol may be employed for the communication between the peer switches, but this is not necessary. In some embodiments, the synchronized shutdown protocol includes the following operations: updating frame forwarding parameters to ensure that frames are no longer routed to the link, ensuring that no further frames remain queued for transmission over the link in either peer switch, and optionally clearing any ACLs or other access local settings from at least one of the peer switches. After these operations have been performed, the link may be shutdown.

One aspect of the invention pertains to a general method, implemented on a Fibre Channel switch coupled to an inter-switch link, for gracefully shutting down the inter-switch link. The method may be characterized by the following operations: (a) determining that the inter-switch link is to be shut down; (b) modifying forwarding parameters to ensure that no further frames are forwarded from the switch onto the link; (c) communicating with a peer switch on the other side of the inter-switch link to synchronize actions between the two switches on the inter-switch link; (d) ensuring that no frames remain queued on the switch for transmission on the inter-switch link; and (e) shutting down the inter-switch link. Typically, each of operations, (a)-(d) is performed prior to shutting down the link, and in many embodiments operations (a)-(d) are performed in the order presented.

In some embodiments, shutdown protocol also requires aborting and/or completing any pending changes for the inter-switch link. Examples of such changes include changes to physical settings such as the transmission speed of the link as well as logical settings such as a port channel configuration involving the link. In a preferred embodiment, this additional operation is performed after (a) and before or during (b).

The synchronizing actions may be implemented in many different ways. In one example, they involve (a) informing the peer switch that the inter-switch link is being shut down; and (b) receiving an acknowledgment from the peer switch indicating that the peer switch has taken or will take actions in preparation for shutting down the inter-switch link. In a specific embodiment, the synchronizing is performed using communications in an EPP protocol.

Modification of the forwarding parameters may include updating a forwarding table on the switch in question. If the information about the link change is required at other switches on a network (switches not on the link to be shutdown), the method may include informing other switches on a network that the inter-switch link will shut down. This is information is provided in a format intended to cause the other switches to update their forwarding tables.

Various techniques may be employed for ensuring that no frames remain queued on the switch (operation (d)). For example, the process may wait for a defined period of time to allow any queued frames to drain onto the inter-switch link. Alternatively, the method may deterministically confirm that there are no queued packets in the switch for transmission on the inter-switch link. This could take the form of a query regarding the state of the relevant queue(s).

Further, the protocol may require an indication from the peer switch that the link can be shut down. This may take the form of a message from the peer received after or while ensuring that no frames remain queued on the switch. In a specific embodiment, this is accomplished by, for example, (i) informing the peer switch that the link can be shut down; and (ii) receiving confirmation from the peer switch that it is prepared for the link to come down.

A related aspect of the invention pertains to a graceful shutdown protocol implemented on a Fibre Channel network. Such protocol may be characterized by the following sequence of operations: (a) determining that the inter-switch link is to be shut-down; (b) modifying forwarding parameters in both switches to ensure that no further frames are forwarded from the switches onto the inter-switch link; (c) sending one or more communications between the switches coupled to the link to ensure that both switches will participate in a graceful shut down protocol of the inter-switch link; (d) ensuring that no frames remain queued in at least one of the switches for transmission on the inter-switch link; (e) after (d), sending a communication to the second switch informing it that the link can be shut down; (f) receiving confirmation from the second switch that it is prepared for the inter-switch link to shut down; and (g) shutting down the inter-switch link.

Still another aspect of the invention pertains to computer program products including machine-readable media on which are stored program instructions for implementing at least some portion of the methods described above. Any of the methods of this invention may be directed, in whole or in part, by executing program instructions provided on such computer readable media. In addition, the invention pertains to various combinations of data and data structures generated and/or used as described herein.

These and other features and advantages of the present invention will be described in more detail below with reference to the associated figures.

DETAILED DESCRIPTION

Introduction

Figure 1A:
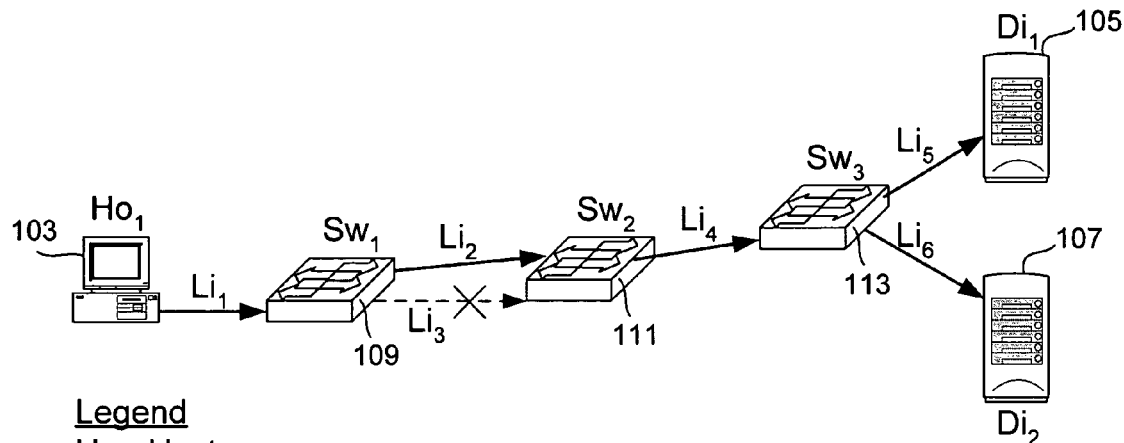
FIG. 1A depicts a simple network topology in which two switches are coupled by two separate links, one of which is shut down gracefully in accordance with an embodiment of this invention.

The graceful port shutdown protocol of this invention coordinates among various components involved in the process of administratively bringing down a link at both ends of an Inter-Switch Link (ISL) connecting two switches. Execution of the protocol avoids or reduces frame drops and/or reordering. This protocol requires peer switches to perform the various actions when bringing down an ISL in a synchronized manner. In one implementation, this protocol uses the Exchange Peer Protocol (EPP) as the underlying transport to carry the graceful port shutdown protocol frames.

Without executing the protocol of this invention, administratively bringing down a link typically involves the following local actions performed in a non-coordinated fashion:

(1) Updating the forwarding table entries to remove the link in question from the forwarding path. This makes sure that no new frames arriving at the impacted switch are sent out through the port.

(2) Cleaning up the programmed ACL entries from the affected port. This causes frames coming from the neighboring switch on the port to get dropped on ingress.

(3) Turning off the laser. This will physically bring down the link.

In the absence of a graceful port shutdown protocol, these tasks are performed in parallel by the two switches. Before the peer switch has removed its forwarding table entries and drained all packets scheduled to go out on this port, frames will continue to be received on the ISL port. If at this time, the ACL entries have been removed, these frames will be dropped on ingress (when received by this switch) because of ACL lookup failure. Similarly, if the laser is shut down before the peer switch has removed its forwarding entries and drained all packets scheduled to go out on this port, these frames will be dropped by the peer switch because of the destination port being down.

In some embodiments of the invention, a synchronized shutdown between the switches at either end of the link in question may involve the following features: (a) disallowing any further operations relevant to the settings or status of the link, (b) modifying relevant parameters to ensure that no further frames are forwarded on the link, (c) concluding that no further frames are still queued for transmission over the link, and (d) bringing down the link (e.g., turning off the relevant laser used to transmit optical data over the link).

In a specific embodiment of the invention, a shutdown protocol enforces the following sequence of actions:

(1) First the port in question is removed from the forwarding tables on both the switches. This ensures that any new frames coming in will not be routed through this port.

(2) Second the protocol then waits for a sufficient time to ensure that all the frames that are already present in the switches and have been queued to go out on this port have been drained out.

(3) Next, the ACL entries are removed from the linecards. As there are no more frames to be received on this port, it is now safe to perform this action.

(4) Finally, the link is brought down.

Figure 1B:
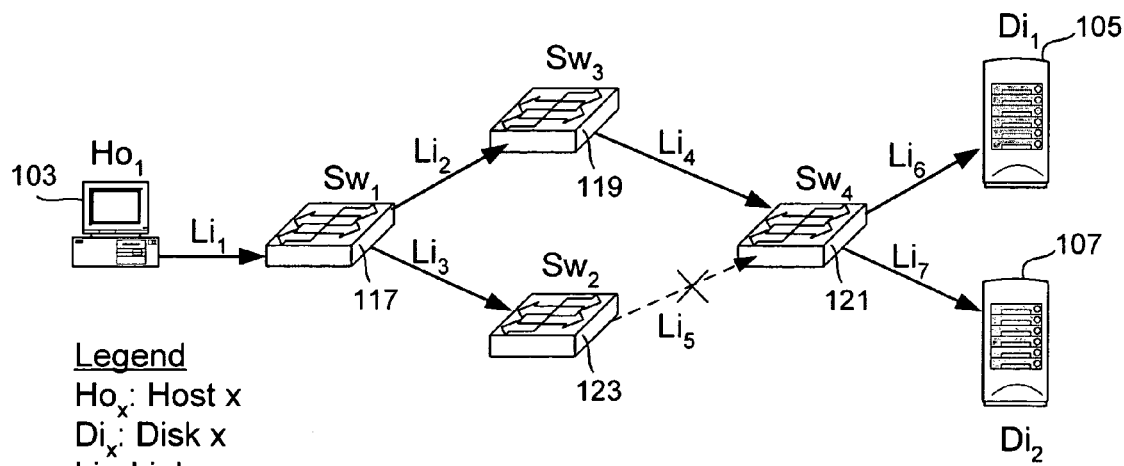
FIG. 1B shows a different network topology employing two parallel paths through a fabric, each employing three separate switches, and showing one link in one of the paths shutting down gracefully in accordance with an embodiment of this invention.

Two example topologies where the invention can come into play are depicted in FIGS. 1A and 1B. FIG. 1A depicts a storage area network in which a host 103 communicates with two storage devices 105 and 107 via a Fibre Channel fabric including three switches 109, 111, and 113. All traffic between host 103 and the devices 105 and 107 must pass through each of the three switches. The switches are linked to one another though inter-switch links. As depicted in this figure, there are two links Li2 and Li3 between switches 109 and 111. Thus, frames sent between host 103 and one of the storage devices can take two paths: path 1 Li1, Li2, Li4, and Li5/Li6 or path 2 Li1, Li3, Li4, and Li5/Li6. A normal reason for having two links between switch 109 and switch 111 is for load balancing implemented by, for example, a routing protocol (e.g., FSPF). This example, like all other examples herein, assumes that inter-switch link Li3 is being brought down in a planned manner (e.g., by user action). As depicted, when link Li3 is about to shut down, load balancing can be turned off and traffic safely routed across Li2 before the physical link is shutdown, thus ensuring no frame drops because of link Li3 shutting down.

FIG. 1B shows a different fabric topology having switches 117, 119, 121, and 123 connected by inter-switch links and E ports. The fabric provides Fibre Channel communication between host 103 and storage nodes 105 and 107. In this example, the fabric topology provides two link paths between the host and the storage nodes: path 1—Li1, Li2, Li4, and Li6/Li7, and path 2—Li1, Li3, Li5, and Li6/Li7. Assuming that the two paths are roughly equal cost paths, a load balancing mechanism normally shares the load across the paths.

Now if Li5 is shut down due to user action, switches 121 and 123 become aware of this first. They will, in accordance with this invention, update their frame forwarding parameters (e.g., by performing FSPF Link State Record update) followed by new route computations. New routes are rapidly installed in switches 121 and 123 requiring that frames go back to switch 117 (since switch 123 understands that switch 117 has reachability for switch 121). This should not be a problem so long as switch 117 quickly learns the new route as well and so forwards all frames to switch 119, without sending any frames to switch 123.

There could be a transient problem existing during the time between when switch 123 updates its routing parameters and when switch 117 does likewise. Traffic taking link Li3 will travel to switch 123, be forwarded back to switch 117, which will send it back to switch 123 because its forwarding parameters have not yet been updated. Thus, a transient network loop will be created. However, as soon switch 117 can perform new route computations (or otherwise update its forwarding parameters), it will use Li2 alone to send traffic to switch 119 and the transient loop is resolved. The greatest risk in this case is that frames could be dropped if the loop is not resolved quickly. In normal routing protocols (e.g., FSPF) rapid convergence will prevent this situation.

Note that while both of the topologies described above contain alternative paths between two end nodes, the invention can be applied in any topology in which a link is about to go down. It should also be noted that the various links shown in the figures represent physical and/or logical links between adjacent switches. The invention applies regardless of whether the link in question is a physical link or a logical link.

Shutdown Protocol and Communications Format

Figure 2:
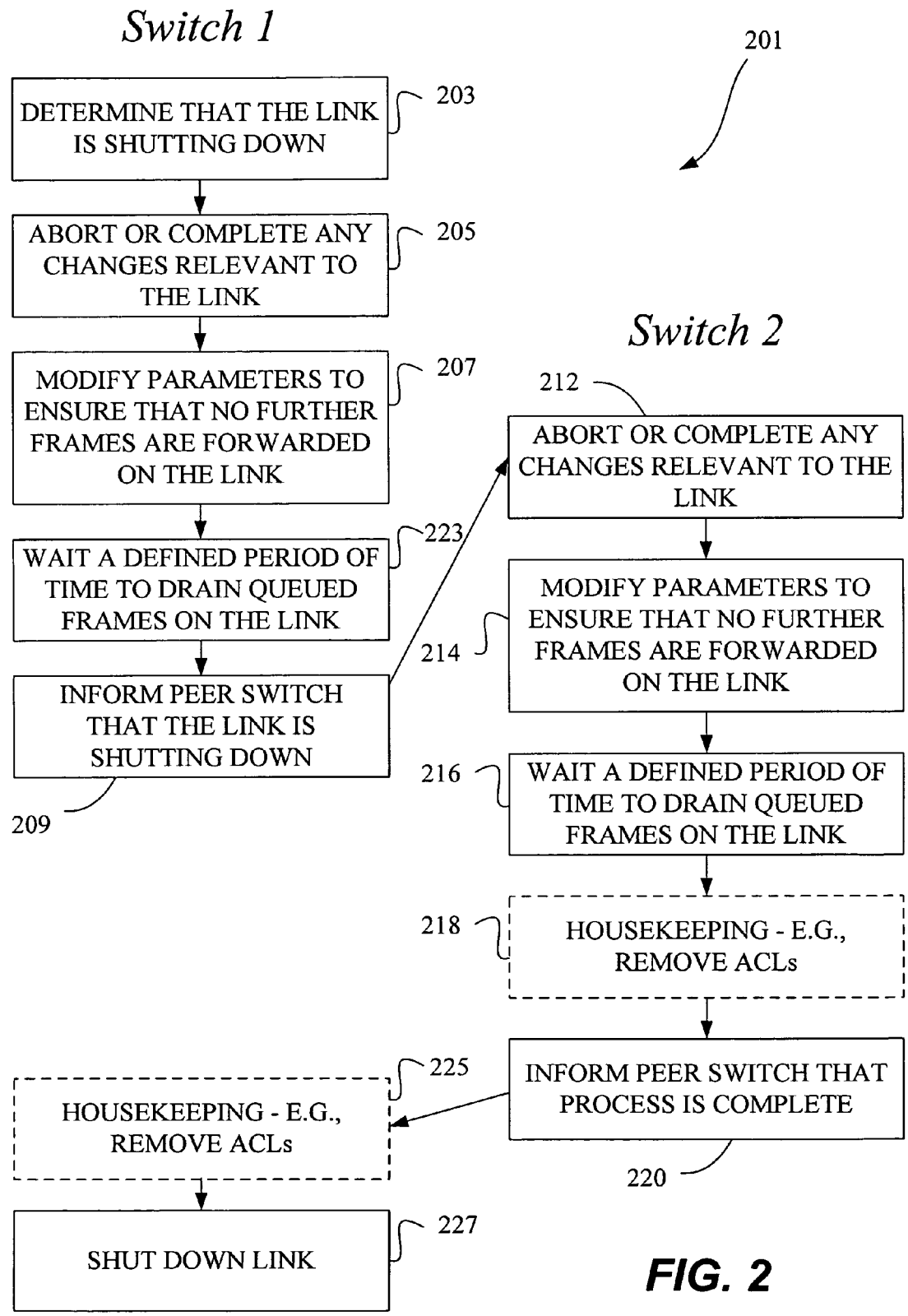
FIG. 2 is a process flow chart depicting operations that may be performed locally on a Fibre Channel switch implementing a graceful port shut down in accordance with an embodiment of this invention.

FIG. 2 presents a flow chart showing how, in accordance with one embodiment of this invention, a given pair of switches sharing an inter-switch link may affect a graceful shut down of that link. The depicted process shows the operations of a first switch on the left side of the figure ("Switch 1") and the operations of its peer switch on the right side of the diagram ("Switch 2"). As depicted, a shut down procedure 201 begins with a determination by a switch that its link is to be shut down. See block 203. In many scenarios this is accomplished by an administrator explicitly or implicitly notifying the switch at one end of the link that the link will be going down for scheduled maintenance or for some other reason. One of the initial procedures performed by the switch upon receipt of such information is depicted in a block 205. As indicated there, the switch will abort or complete any changes relevant to the link. This effectively locks out any further operation premised on the existence of a functioning link. Examples of the changes in question include setting up a logical port channel employing the link, or a change in some physical parameter of the link such as its transmission speed, port trunk mode, etc.

In addition, the switch that was notified of the shutdown may now modify its parameters to ensure that no further frames are forwarded on the link. See block 207. In a conventional Fibre Channel network, this would most notably involve updating all forwarding tables in the switch in question to remove references to the link as a potential forwarding path on the network fabric. Typically, this protocol does not wait for the other switches in the network (which are not directly connected to the link that is going down) to update their forwarding parameters.

Depending on the type of link being shut down, the forwarding parameters are modified locally at the two link switches only or together with other switches on the fabric. In Fibre Channel networks, the FSPF protocol is commonly employed to propagate forwarding parameter changes across the switches on the network fabric. There may be scenarios in which the link being shut down is merely one physical component of a collection of physical links that together comprise a logical link known to other switches on the fabric. In this situation, shut down of the physical link will not constitute a complete shut down of the logical link. Therefore, it may be unnecessary to cause other switches on the fabric to update their forwarding parameters as well. The switch may also choose to inform other control plane applications that the link is going down and that they should stop sending any frames on this link. One example of such an application is a Fibre Channel zoning application.

In one embodiment, the forwarding infrastructure is modified by updating a Link State Record by one thread in FSPF. This is then notified to another thread in FSPF which performs route computation. The new route is then installed on all linecards of the switch. If appropriate for the type of link shutting down, the link state change is also flooded across the network. In one embodiment, the local switch first makes all relevant forwarding updates in all of its affected linecards before proceeding with the other steps in the protocol. It is desirable to have this information updated on all switches. In a particular embodiment, the routing protocol implemented in Fibre Channel networks (FSPF) uses reliable flooding and does not acknowledge receipt of route updates.

Next, as illustrated at a block 208, Switch 1 waits a defined period of time to ensure that all queued frames for the link in question are drained across the link. The duration of this waiting period will be architecture dependent. For example, the duration will be about 1 millisecond to 5 seconds from the time when the forwarding parameters are updated (approximately 500 milliseconds in a specific example). In an alternative implementation, a deterministic mechanism may be employed to specifically confirm that no frames remain queued on the link. For example, logic executed on the switch backplane could query to the relevant port for the status of its queue.

In the depicted embodiment, after Switch 1 waits the defined period, it informs the switch at the other end of the link (Switch 2) that the link will be going down. This is depicted in block 209. A feature of the graceful shut down described herein is synchronization of the shut down procedure between switches at the two ends of the link.

After informing the other switch on the link that the link is going down, Switch 1 waits to receive an acknowledgment from the other side before taking additional steps toward shut down. The acknowledgment can take many forms but it should indicate, at least implicitly, that the peer switch is preparing to take the necessary actions to shut down the link in concert with the notifying switch.

Upon receipt of the communication from Switch 1 that the link is going down, Switch 2 initiates a parallel sequence of operations. As shown in blocks 212, 214, and 216, Switch 2 first aborts or completes any changes relevant to the link, then modifies its forwarding parameters, and thereafter waits a defined period of time to ensure that all queued frames for the link in question are drained across the link. These operations are similar to operations 205, 207 and 208 undertaken by Switch 1.

Switch 2 may be designed or configured to conduct, at this point, certain housekeeping tasks to ensure that the link can be brought up gracefully. See optional block 218. As an example, the switch may clear out any entries in any access control lists that it maintains. Such controls may vary over the time while the link is down. Therefore, it is preferable to have all of the controls cleared out so that a fresh list can be generated when a link comes back up. In some switch designs, access control lists (ACLs) are used to deny acceptance of frames at the switch itself. In one implementation, by default, no frames are allowed to pass until appropriate entries are provided in the access control list. Therefore, if the access control list were cleared prematurely, while frames were still being forwarded over the link to the switch in question, those frames would be improperly dropped. Therefore, the housekeeping operations referenced at block 218 are performed only after the switch in question is sure that no further frames are being forwarded over the link from the switch at the end of the link.

After concluding that no frames remain queued for the link and optionally clearing any ACLs, Switch 2 has done all that it needs to do from a local perspective in preparation for the link to be shut down. So at this point, the switch informs its peer (Switch 1) that its shutdown processing is complete. See block 220.

In some embodiments, Switch 1 may be conducting its shutdown operations in parallel with Switch 2. When intermittent communications between the switches do not occur, Switch 2 does not know which stage Switch 1 has reached in the overall process. So it is possible that the communication sent at block 220 will be received at Switch 1 while Switch 1 is conducting a shutdown operation. After receiving a message from Switch 2, Switch 1 can then proceed to perform the housekeeping tasks shown in block 225.

The message sent by Switch 2 at block 220 informs Switch 1 that Switch 2 is prepared to have the link shut down, and no further communication is required. Thus, Switch 1 recognizes that there should be no further packets coming to it over the link from the other switch and that it is now safe to shut down the link.

Finally, after coordinating with the peer switch, modifying forwarding parameters, ensuring that no packets remain queued for the link and optionally clearing any ACLs, it will be appropriate to actually shut down the link. This is indicated at a block 227. In a typical embodiment, this simply means turning off a laser, which provides the transmission medium on which data is carried.

Interaction diagrams presenting details of a communication protocol between peer switches on a link to be shut down will now be described. These diagrams illustrate the use of EPP as the communication protocol employed between the two switches at opposite ends of the link. EPP ("Exchange Peer Parameters") is a two-phase protocol in which (1) information is exchanged about peer port configurations of interest and (2) results of the exchange of information are applied to hardware and/or software of the peer ports, as needed. The first phase is referred to a "SYNC" phase and the second phase is referred to as a "COMMIT" phase. The EPP protocol may be employed for diverse purposes such as, for example, transitioning port channel configurations and negotiating ISL trunk parameters for supporting multiple VSANs. EPP is described in U.S. patent application Ser. No. 10/430,491, filed May 5, 2003, entitled, "METHODS AND DEVICES FOR EXCHANGING PEER PARAMETERS BETWEEN NETWORK DEVICES", Publication No. US-2004-0100910-A1, published on May 27, 2004, which was previously incorporated by reference. It is important to note that EPP is but one example of a communication protocol that can be employed for this purpose. In some examples, the communication protocol need not even be a two-phase protocol; some single-phase protocols can work equally well. As an example, the existing FC SW-ILS definition in Fibre Channel can be used. FC SW-ILS is request response based protocol set with delivery acknowledgement. A new SW-ILS command can also be reserved and used to perform this operation.

In the examples that follow, the relevant communications between the two peer switches can be summarized as follows: synchronize locking of the ports on each end of the link, begin informing the forwarding infrastructure that the port is being shut down (done in a way allowing sufficient delay to drain all previously queued frames on the ports) and acknowledge that both ports are ready to have the link shut down.

For purposes of the depicted protocol there is an "originator switch" which begins the EPP protocol communications and a "target switch" which follows the EPP protocol in response to an initial communication from the originator switch. The types of EPP communications sent follows a set sequence dictated by the originator switch. Typically, the originator switch is the switch on the link that first learns that the link will be shutting down. To account for the possibility that both switches recognize that the link is shutting down, EPP uses switch WWN (Fibre Channel World Wide Name) based collision detection/resolution to deterministically define the behavior in case of a EPP cross-over. This is similar to the mechanism employed in other protocols like ELP in the Fibre Channel standard. When using a SW-ILS based protocol to implement graceful shutdown, the same collision detection/resolution strategy can be used.]

Figure 3:
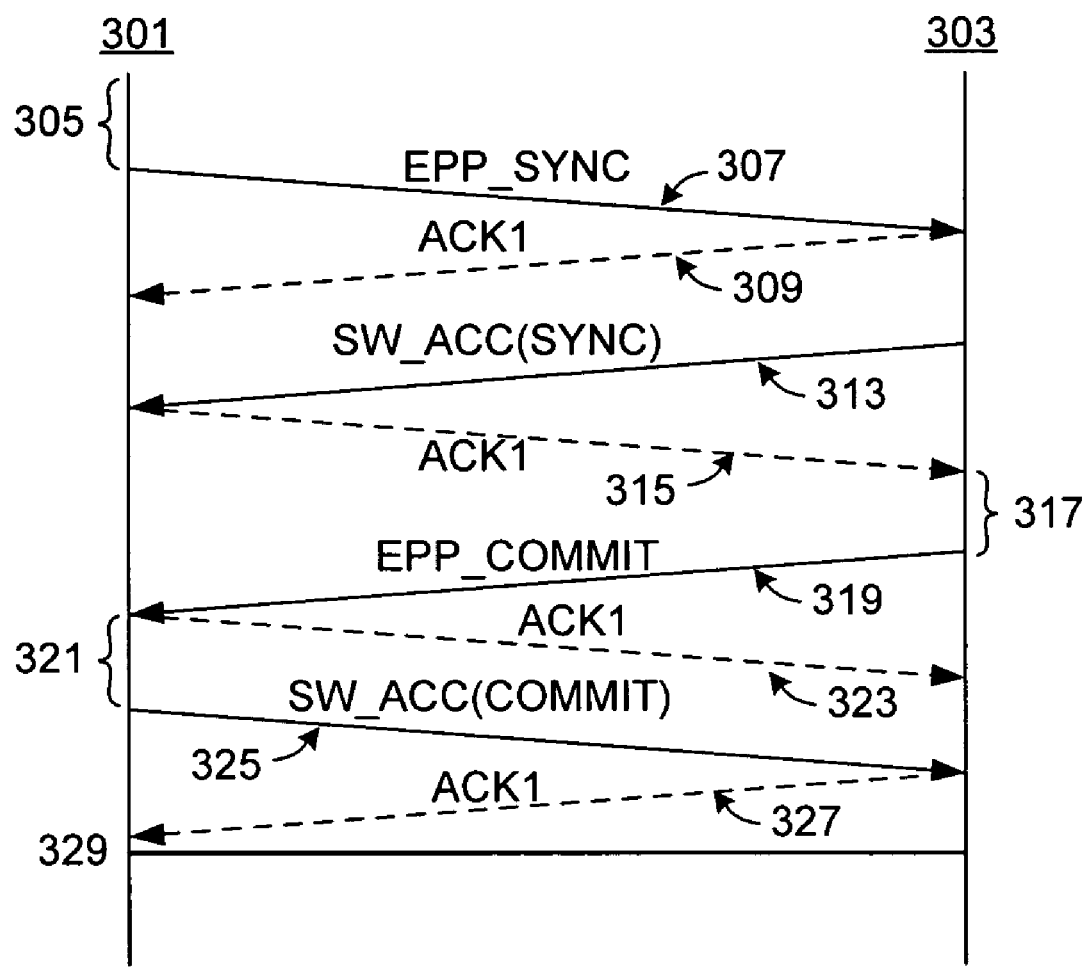
FIG. 3 is an interaction diagram showing the stages in an exemplary communication protocol employed by two peer switches (straddling a link to be shut down) in accordance with an embodiment of this invention.

FIG. 3 shows a general sequence for EPP communications employed in one example of a graceful port shutdown exchange. An originator switch 301 is indicated by a vertical line on the left side of the figure, and a target switch 303 is indicated by a counterpart vertical line on the right side of the figure. Initially, originator switch 301 becomes aware that a link between the two switches will be shutting down. It then begins its shutdown procedures by locking its port with respect to any action at this stage. It also updates forwarding table entries as appropriate. This typically involves informing FSPF/forwarding infrastructure that the port is being brought down. These operations correspond to operations 205, 207 and 208 in FIG. 2 and are depicted by region 305 in FIG. 3. After completing these operations, originating switch 301 sends an EPP_SYNC message 307 to target switch 303. Message 307 effectively informs target 303 that the link is going down and that the originator 301 wishes to engage the target in the graceful port shutdown protocol. The target switch 303 confirms receipt of the SYNC message by sending an EPP ACK1 message 309.

Target switch 303 then sends an EPP accept message, SW_ACC (SYNC) message 313. This effectively informs originator switch 301 that the target is prepared to go forward with the protocol. The originator responds with an ACK1 message 315, acknowledging that it has received SW_ACC message 313. Receipt of message 315 then triggers target switch 303 to take some specific actions relevant to its frame forwarding parameters. See action 317. Typically this involves informing the Fibre Channel FSPF/forwarding infrastructure that the port is being brought down. As indicated, this may involve updating forwarding table entries in the target switch. The target switch may also notify switches on links other than the link to be shut down.

In addition updating its frame forwarding parameters, target switch 303 may lock its port with respect to actions on the port. After updating the forwarding table entries, the target switch will ensure that all frames destined to go out on this port are drained. In this embodiment, this is accomplished by waiting for 500 ms. This also ensures that the frames on the originator switch have also been drained. After performing this action, it may also update its ACLs and/or take other steps toward housecleaning. Collectively, the operations at 317 correspond to operations 212-218 and 305 described above.

After switch 303 has completed modifying its forwarding parameters and completed any other internal operations as appropriate and notified any other affected switches that are not attached to the link (i.e., operation 317 is completed), it sends an EPP_COMMIT message 319 to originator switch 301. Receipt of message 319 informs the originator switch that the target switch has proceeded with modification of its forwarding parameters. Immediately upon receipt of the EPP_COMMIT message, the originator acknowledges receipt with an ACK1 message 323. This message 319 may trigger originator switch 310 to clear its ACLs and perform any other housekeeping operations. See operation 321.

After completing any appropriate actions at 321, originator switch 301 sends a SW_ACC (COMMIT) message 325 to target switch 303. This informs the target that the originator is ready for the link to shut down. Assuming that the target switch 303 is also prepared have link shut down, it simply sends an ACK1 message 327. This then effectively tells the originator that it is now safe to shut down the link.

After the ACK1 message has been received by the originator, all traffic has ceased on the link and the originator initiates the final action. Normally that means that the physical link can be shut down. See operation 329. However, as explained elsewhere herein the final action can be something else such as blocking a VSAN.

In the above procedure, note that the link remains available and possibly passes data traffic from the originator switch to the target switch during the entire period from initial notification that the link is shutting down (305) to when the originator switch sends the SW_ACC (COMMIT) message 325. Thereafter, the link no longer receives data traffic from the originator to the target. Further, the link may receive data traffic from the target to the originator up to the time when the target transmits EPP_COMMIT message 319. Thereafter no data traffic flows from the target to the originator. However, the link does not actually shut down until reaching 329. Note that the SYNC operation also serves as a lock on the port and guards it against any configuration while it is being brought down.

Application to Both Physical and Logical Links

The shutdown protocol described herein supports logical as well as physical links. Examples of supported physical links include physical links functioning as independent inter-switch links and physical links forming part of a logical port channel. Examples of supported logical links include FCIP tunnels, which behave as logical ISLs between two switches and port channels, which are an aggregation of multiple physical links or FCIP tunnels.

If less than all physical links comprising the logical link are shut down, the logical link still exists. Hence, it may be unnecessary to update forwarding decisions at any locations other than the two physical switches that straddle the link. Other switches on the fabric recognize only the logical link and not the physical link. As the logical link still exists, they need not update their forwarding parameters.

FIG. 1A presents an example where two physical links Li2 and Li3 could together comprise a logical link. In such Li3 shuts down, the switches 109 and 111 must update their routing parameters but other switches on the fabric (e.g., switch 113) would not necessarily need to update their parameters. These other switches know only the logical link and it still exists. This highlights a difference between the case where only a physical link exists and where a logical link comprised of multiple physical links exists.

Figure 4A:
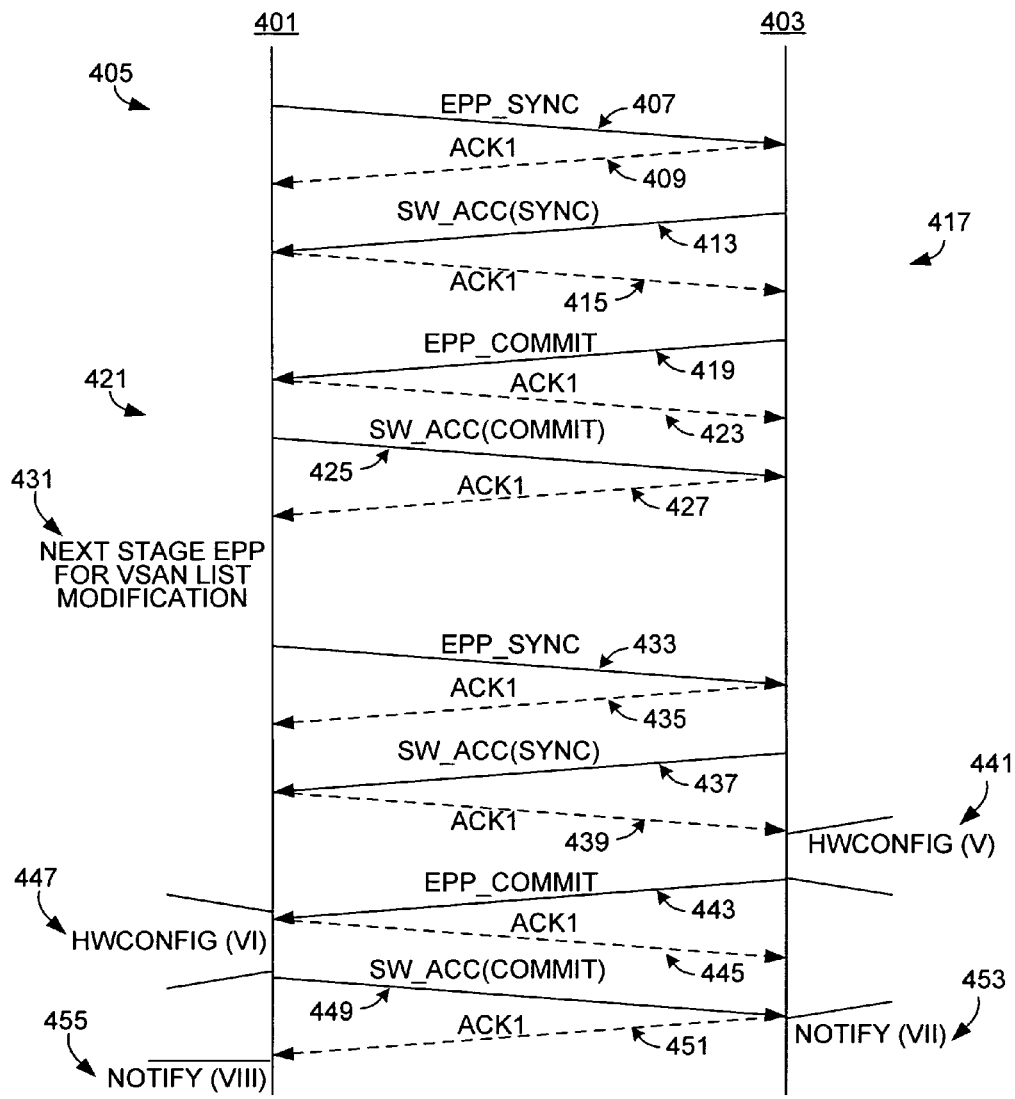
FIG. 4A is an interaction diagram showing the sequence of communications employed by two peer switches to remove a VSAN from their trunking E_ports and an associated inter-switch link, in accordance with an embodiment of this invention.

In addition to the above examples, for a trunking inter-switch link which is carrying traffic for multiple VSANs, if one or more of the VSANs is removed, the graceful port shutdown protocol can be run as part of the trunk protocol to ensure that there is no frame loss resulting from this action. FIG. 4A presents one example of the interactions employed in a trunking port to remove a VSAN. Note that a single physical SAN topology can support multiple virtual SANs (VSANs). Each of these comprises specific nodes, ports, and links on the physical topology. See U.S. patent application Ser. No. 10/034,160 (U.S. Publication No. US-2003-0118053-A1, published Jun. 26, 2003) Entitled: METHODS AND APPARATUS FOR ENCAPSULATING A FRAME FOR TRANSMISSION IN A STORAGE AREA NETWORK, by Gai et al. (incorporated herein by reference for all purposes) for a further description of VSANs. In some cases a single inter-switch link and associated E_ports can carry traffic for two or more VSANs. Such link is referred to as a trunking ISL and such ports are referred to as trunking E_ports. (More generally, the concept of trunking applies to any port or link that carries traffic for multiple physical or virtual links.)

The operation depicted in FIG. 3 involves a single EPP exchange to perform the necessary actions. In FIG. 4A, the sequence of operations performed is somewhat changed. Two EPP exchanges occur; one exchange ensures that the port is gracefully brought down and a second one modifies the allowed VSAN list.

As with the exchange depicted in FIG. 3, there are two switches involved in the exchange depicted in FIG. 4A, an originator switch 401 and a target switch 403. The switches are indicated by vertical lines shown on the left and right side of the diagram, respectively. Initially, the originator switch receives notification that the inter-switch link in question will be shutting down. Therefore, according to the graceful port shut down protocol of this embodiment, the originator switch locks the port and thereby prevents any further state changes to it. It also updates its frame forwarding parameters by, e.g., notifying FSPF that a VSAN identified for removal is being blocked. Again, this will involve both a local update as well as a network-wide update. This is depicted as operation 405 on the originator switch. This procedure is essentially identical to operation 305 depicted in FIG. 3. There is an interesting distinction to make. With the protocol implemented in FIG. 3, the physical port is being shut down, and this will affect all the VSANs on the port in the case where it is trunking. In the case of FIG. 4A, there are multiple VSANs sharing the link and only a subset of those are being brought down. In this case for other VSANs the port will continue to be up. Each individual frame passing over the link is associated with a single VSAN. The individual VSANs are identified by a particular VSAN identifier at an appropriate field in each frame. Thus, the protocol must choose a specific VSAN in which to carry out the EPP protocol exchanges described in the implementing of FIG. 4A. For this purpose, a control VSAN may be employed. This is a predefined VSAN (eg. 4094) having a well-known Fibre Channel address that does not carry any data traffic and is used only for the purpose of communicating messages pertaining to control of the various VSANs sharing the physical topology. In the embodiment depicted in FIG. 4A, it is assumed that such control VSAN carries out all the EPP communications shown therein.

After the originator switch locks its port and updates forwarding parameters as indicated as 405, it sends an EPP_SYNC message 407 to target switch 403. Receipt of this SYNC message triggers the target switch to reply with an ACK1 message 409 and then send an SW_ACC (SYNC) message 411 over the link to originator switch 401. The originator then directly responds over the link with an ACK1 message 415 acknowledging receipt of the SW_ACC (SYNC) message.

Upon receiving the acknowledgment message 415, the target switch may perform a corresponding lock of its port and modification of its forwarding parameters by, for example, notifying FSPF that a VSAN identified for removal is being blocked. See operation 417. FSPF will then update the forwarding table at target switch 403 as well as flooding the network with a notification of the forwarding update.

After target switch 403 concludes the operation equivalent to 317 in FIG. 3, it transmits an EPP_COMMIT message 419 to originator switch 401. Upon receiving message 419, the originator replies with an acknowledgment (ACK1 message 423). The originator switch performs the housekeeping tasks if needed before sending an SW_ACC (COMMIT) message 425 back to target switch 403. The target then immediately replies with an acknowledgment (ACK1 message 427).

This effectively concludes the modifications necessary to block transmission of frames for the VSAN in question from being transmitted over the link in question. However, the logic associated with the allowed VSAN list must also be updated. Thus, the depicted protocol employs a second EPP exchange for this purpose. The transition from the shut down stage to the VSAN list modification stage is indicated by an operation 431 on originator switch 401. For this purpose, originator 401 begins a second EPP exchange by sending an EPP_SYNC message 433. Again, this message is sent on the logical port on of the link associated with the control VSAN. Upon receiving EPP_SYNC 433, the target switch 403 replies with an ACK1 message 435.

Thereafter, target switch 403 sends an EPP accept message (SW_ACC (SYNC) message 437. The originator switch 401 receives this acceptance and immediately replies with an ACK1 message 439. This triggers the target switch to configure itself to remove the VSAN in question from its allowed VSAN list. See operation 441 (HWCONFIG (V)).

After completing the configuration to remove the VSAN in question from its allowed VSAN list, the target switch transmits an EPP_COMMIT message 433 to the originator switch. Upon receipt of this message, the originator replies immediately with an ACK1 message 435 and begins its own configuration to remove the VSAN in question from its allowed VSAN list. See operation 437 (HWCONFIG (VI)) on originator switch 401.

After completing its configuration of its VSAN list, switch 401 sends an SW_ACC (COMMIT) message 439 to the target switch. The target replies with an ACK1 message 451 and sends a state change notification to other components in the system. See operation 453 ("NOTIFY (VII)") on target switch 403.

Upon receipt of the ACK1 message 451, the originator switch 401 sends its own state change notification to other appropriate components in the system. See operation 455 ("NOTIFY (VIII)"). This then effectively concludes removal of the VSAN in question from the list of allowed VSANs for the trunking E_port associated with the link in question. Note that the link can be a single physical link or a port channel comprised of multiple physical links. Note also that while this specific implementation showed use of EPP protocol exchanges to accomplish the result, many other communication protocols for exchanging peer parameters could be employed to the same effect.

A similar sequence of exchanges can be employed to transition from a trunking E_port which carries transmission for multiple VSANs (or other logical entities on a physical topology) to a non-trunking_port. This operation can also be accomplished with two EPP exchanges. The first would ensure that all data traffic was stopped on the link undergoing the transition. This is accomplished with a series of messages and local operations shown as reference numbers 405-427 in FIG. 4A. As with the situation depicted in FIG. 4A, these EPP messages could be sent under the control as a particular control VSAN. Thereafter, a second EPP exchange is employed to effect the actual transition from trunking to non-trunking operation. The communications to accomplish this result are depicted as operations 433 through 451 in FIG. 4A. However, at this point, the concept of a control VSAN is no longer recognized. Therefore, the communications are undertaken by "port VSAN" representing the single VSAN remaining after the conversion from trunking to non-trunking mode at the ports in question. In other words, a non-trunking link will transmit traffic for only a single VSAN. That VSAN is now the port VSAN employed to complete the transition to non-trunking mode.

Figure 4B:
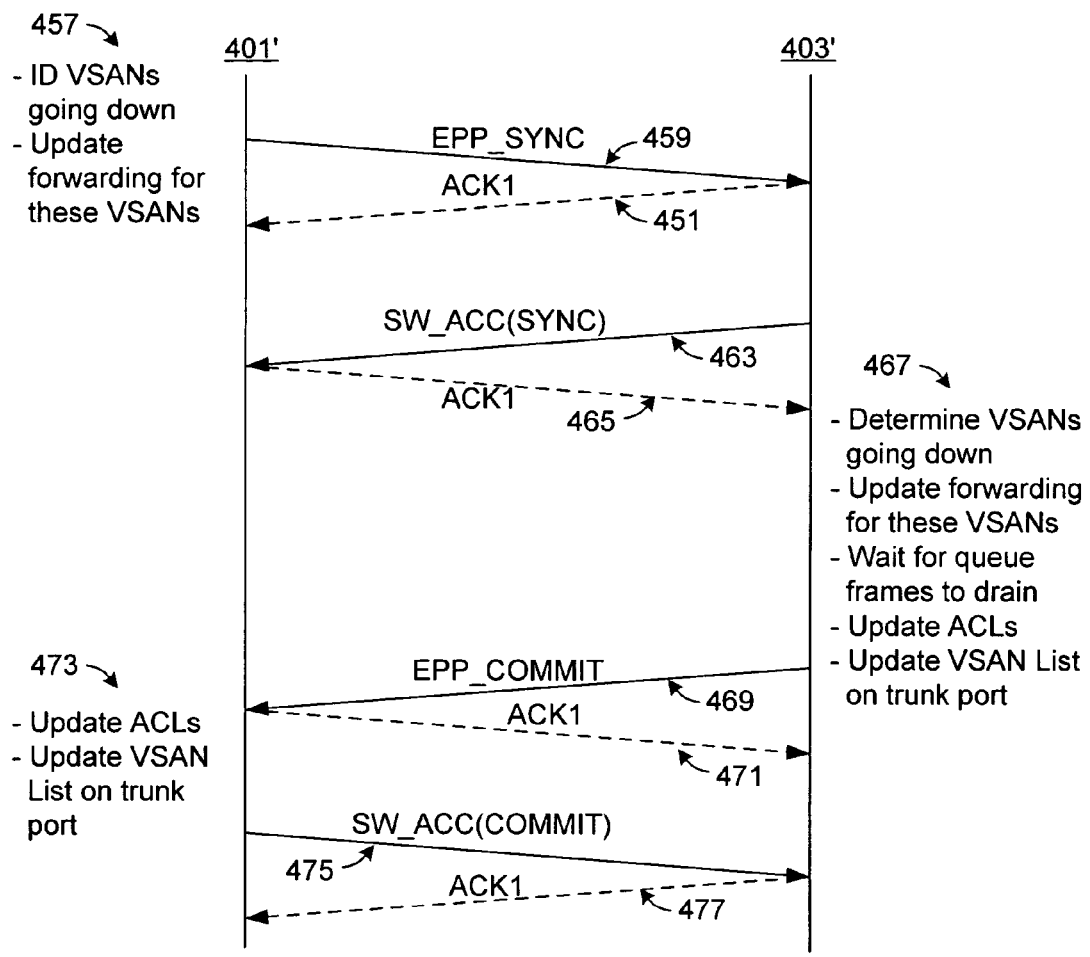
FIG. 4B is an interaction diagram showing the sequence of communications employed by two peer switches to remove a VSAN from their trunking E_ports and an associated inter-switch link, in accordance with another embodiment of this invention.

FIG. 4B depicts a different process for shutting down one or more VSANs in accordance with an embodiment of this invention. In the figure, the protocol is executed by an originator switch 401' and a target switch 403' connected by a trunking link. The depicted process begins as indicated at a point 457 where the originator switch determines which VSAN(s) are going down and performs the appropriate forwarding updates for these VSAN(s). It may also lock the link as described above. Concurrently with these operations or after they are completed, switch 401' sends an EPP_SYNC message 459. The target switch 403' acknowledges with an ACK1 message 461 and thereafter sends an accept message 463 (SW_ACC). The originator then acknowledges with an ACK1 message 465.

At this point in the protocol, the target switch begins making its internal changes. First, it determines which VSANs are going down and then updates its forwarding parameters for these VSANs. See operation 467. The target switch then proceeds with the changes by waiting an appropriate length of time for any queued frames to drain onto the trunking link. If appropriate, it also updates/clears any ACLs as described above. Finally, it updates a new VSAN list on the trunk port by updating the information maintained on the port and programming any hardware as needed.

After completing the various changes collectively represented as operation 467, the target switch 403' sends an EPP_COMMIT message 469, which is acknowledged by an ACK1 message 471 from originator switch 401'. The originator then updates its ACLs and provides a new VSAN list for its trunk port. See operation 473. From this point, the originator follows with an accept message (SW_ACC 475). When the target replies with an ACK1 message 477, the originator concludes the process Device Implementation Generally, the techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid implementation of the techniques of this invention may be implemented on a general-purpose programmable machine selectively activated or reconfigured by a computer program stored in memory. Such a programmable machine may be a network device designed to handle network traffic, such as, for example, a router or a switch, particularly a Fibre Channel switch. Such network devices may have multiple network interfaces including frame relay and ISDN interfaces, for example.

For example, the methods of this invention may be implemented in specially configured network devices such as the MDS 9000 family of switches manufactured by Cisco Systems, Inc. of San Jose, Calif. A generalized architecture for some such machines will appear from the description given below. In an alternative embodiment, the techniques of this invention may be implemented on a general-purpose network host machine such as a personal computer or workstation. Further, the invention may be at least partially implemented on a card (e.g., an interface card) for a network device or a general-purpose computing device.

Figure 5:
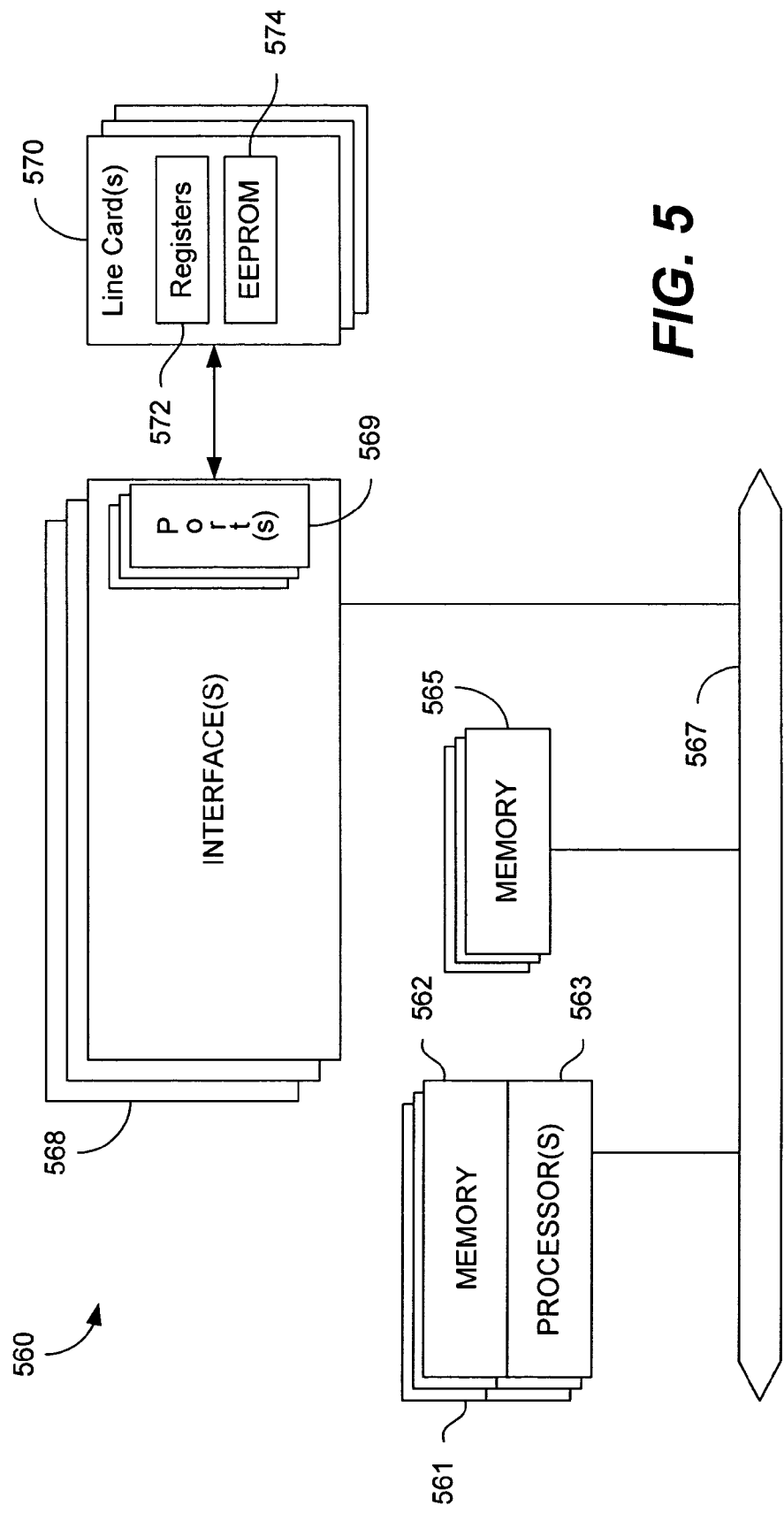
FIG. 5 depicts a switch or other network device that may be configured to perform the methods of the present invention.

Referring now to FIG. 5, a network device 560 suitable for implementing the techniques of the present invention includes a master central processing unit (CPU) 562, interfaces 568, and a bus 567 (e.g., a PCI bus). When acting under the control of appropriate software or firmware, the CPU 562 may be responsible for implementing specific functions associated with the functions of a desired network device. For example, the CPU 562 may be responsible for analyzing frames, encapsulating frames, and forwarding frames for transmission on an inter-switch link. The CPU 562 preferably accomplishes all these functions under the control of software including an operating system (e.g. Windows NT), and any appropriate applications software.

CPU 562 may include one or more processors 563 such as a processor from the Motorola family of microprocessors or the MIPS family of microprocessors. In an alternative embodiment, processor 563 is specially designed hardware for controlling the operations of network device 560. In a specific embodiment, a memory 561 (such as non-volatile RAM and/or ROM) also forms part of CPU 562. However, there are many different ways in which memory could be coupled to the system. Memory block 561 may be used for a variety of purposes such as, for example, caching and/or storing data, programming instructions, etc.

The interfaces 568 are typically provided as interface cards (sometimes referred to as "line cards"). Generally, they control the sending and receiving of data packets over the network and sometimes support other peripherals used with the network device 560. Among the interfaces that may be provided are Fibre Channel interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 562 to efficiently perform routing computations, network diagnostics, security functions, etc.

Although the system shown in FIG. 5 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of the network device's configuration, it may employ one or more memories or memory modules (such as, for example, memory block 565) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; semiconductor memory media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

OTHER EMBODIMENTS

While the invention has been particularly shown and described with reference to specific embodiments thereof, it will be understood by those skilled in the art that changes in the form and details of the disclosed embodiments may be made without departing from the spirit or scope of the invention. For instance, while the above protocol has been described for inter-switch link applications, it may be easily extended to work with devices attached to fabric ports if such protocol is supported by the respective device vendors. Further the shutdown protocol of this invention may be extended to network technologies other than Fibre Channel. Considering these and other variations, the scope of the invention should be determined with reference to the appended claims.

What is claimed is:

1. A method of gracefully shutting down an inter-switch link between a first switch and a second switch on a Fibre Channel network, the method comprising:
   (a) determining that the inter-switch link is to be shutdown;
   (b) modifying forwarding parameters in the first switch to ensure that no further frames are forwarded from the first switch onto the inter-switch link and sending one or more communications to the second switch;
(c) sending a communication to the second switch informing it that the link is to be shut down;
(d) modifying forwarding parameters in the second switch to ensure that no frames are forwarded from the second switch onto the inter-switch link;
(e) ensuring that no frames remain queued in the first switch for transmission on the inter-switch link;
(f) receiving confirmation from the second switch that it is prepared for the inter-switch link to shut down; and
(g) shutting down the inter-switch link.

2. The method of claim 1, further comprising aborting and/or completing at least one pending change for the inter-switch link.

3. The method of claim 2, wherein the aborting and/or completing is performed prior to modifying said forwarding parameters.

4. The method of claim 1, wherein sending one or more communications between the switches to ensure that both switches will participate in a graceful shut down protocol comprises communicating in an EPP protocol.

5. The method of claim 1, wherein modifying said forwarding parameters comprises updating a forwarding table on said switch.

6. The method of claim 5, wherein modifying said forwarding parameters comprises informing other switches on a network fabric with said switch, but not on the inter-switch link, that said inter-switch link will shut down in order to cause said other switches to update their forwarding tables.

7. The method of claim 1, wherein ensuring that no frames remain queued on the switch comprises waiting for a defined period of time for any queued frames to drain onto the inter-switch link.

8. The method of claim 1, wherein ensuring that no frames remain queued on the switch comprises deterministically confirming that there are no queued packets in the switch for transmission on the inter-switch link.

9. A storage area network comprising:
a first Fibre Channel switch;
a second Fibre Channel switch; and
an inter-switch link coupling the first and second Fibre Channel switches,
wherein the first Fibre Channel switch comprises logic for
(a) determining that the inter-switch link is to be shut-down;
(b) modifying forwarding parameters in the first switch to ensure that no further frames are forwarded from the first switch onto the inter-switch link and sending one or more communications to the second switch;
(c) sending a communication to the second switch informing it that the link is to be shut down;
(d) ensuring that no frames remain queued in the first switch for transmission on the inter-switch link;
(e) receiving confirmation from the second switch that it is prepared for the inter-switch link to shut down; and
(f) shutting down the inter-switch link,
wherein the second Fibre Channel switch comprises logic for
(a) modifying forwarding parameters in the second switch to ensure that no frames are forwarded from second switch onto the inter-switch link;
(b) ensuring that no frames remain queued in the second switch for transmission on the inter-switch link; and
(c) sending a confirmation to the first switch that the second switch is prepared for the inter-switch link to shut down.

10. A Fibre Channel switch, comprising:
means for determining that an inter-switch link with a second Fibre Channel switch is to be shut down;
means for modifying forwarding parameters to ensure that no further frames are forwarded from the switch onto the inter-switch link and sending one or more communications to the second Fibre Channel switch;
means for sending a communication to the second switch informing it that the inter-switch link is to be shut down, wherein the communication comprises an indication that forwarding parameters in the second Fibre Channel switch be modified to ensure that no frames are forwarded from the second Fibre Channel switch onto the inter-switch link;
means for ensuring that no frames remain queued on the switch for transmission on the inter- switch link;
means for receiving confirmation from the second Fibre Channel switch that it is prepared for the inter-switch link to shut down; and
means for shutting down the inter-switch link.

11. A computer program product comprising a tangible storage medium on which is provided instructions for gracefully shutting down an inter-switch link between a first switch and a second switch on a Fibre Channel network, the instructions comprising:
determining that the inter-switch link is to be shut down;
modifying forwarding parameters to ensure that no further frames are forwarded from the first switch onto the link and sending one or more communications to the second switch;
sending a communication to the second switch informing it that the link is to be shut down, wherein the communication comprises an indication that forwarding parameters in the second switch be modified to ensure that no frames are forwarded from the second switch onto the inter-switch link;
ensuring that no frames remain queued on the first switch for transmission on the inter- switch link;
receiving confirmation from the second switch that it is prepared for the inter-switch link to shut down; and
shutting down the inter-switch link.

12. The computer program product of claim 11, further comprising instructions for aborting and/or completing at least one pending change for the inter-switch link.

13. The computer program product of claim 12, wherein the aborting and/or completing is performed prior to modifying said forwarding parameters.

14. The computer program product of claim 11, wherein the instructions for sending a communication to the second switch comprises instructions for sending a communication in an EPP protocol.

15. The computer program product of claim 11, wherein the instructions for sending a communication to the second switch comprises instructions for sending a communication in a protocol other than EPP.

16. The computer program product of claim 1, wherein the instructions for modifying the forwarding parameters comprises instructions for updating a forwarding table on said switch.

17. The computer program product of claim 16, wherein the instructions for modifying said forwarding parameters further comprises instructions for informing other switches on a network fabric including said switch, but not via the inter-switch link, that said inter-switch link will shut down in order to cause said other switches to update their forwarding tables.

18. The computer program product of claim 11, wherein the instructions for ensuring that no frames remain queued on the switch comprises instructions for waiting for a defined period of time for any queued frames to drain onto the inter-switch link.

19. The computer program product of claim 11, wherein the instructions for ensuring that no frames remain queued on the switch comprises deterministically confirming that there are no queued packets in the switch for transmission on the inter-switch link.

20. The computer program product of claim 11, further comprising instructions for bringing down the inter-switch link after ensuring that no frames remain queued on the switch for transmission on the inter-switch link.

21. A Fibre Channel switch, comprising:
a port for connecting to an inter-switch link with a second Fibre Channel switch; and
at least one processor configured to do the following:
determining that the inter-switch link is to be shut down;
modifying forwarding parameters to ensure that no further frames are forwarded from the switch onto the inter-switch link and sending one or more communications to the second Fibre Channel switch;
sending a communication to the second switch informing it that the inter-switch link is to be shut down, wherein the communication comprises an indication that forwarding parameters in the second Fibre Channel switch be modified to ensure that no frames are forwarded from the second Fibre Channel switch onto the inter-switch link;
ensuring that no frames remain queued on the switch for transmission on the inter-switch link;
receiving confirmation from the second Fibre Channel switch that it is prepared for the inter-switch link to shut down; and
shutting down the inter-switch link.

22. The Fibre Channel switch of claim 21, wherein the at least one processor is further configured to abort and/or complete at least one pending change for the inter-switch link.

23. The Fibre Channel switch of claim 22, wherein the at least one processor is further configured to abort and/or complete the at least one pending change prior to modifying the forwarding parameters.

24. The Fibre Channel switch of claim 21, wherein modifying said forwarding parameters comprises updating a forwarding table on said switch.

25. The Fibre Channel switch of claim 24, wherein modifying said forwarding parameters further comprises informing other switches on a network fabric including said switch, but not via the inter-switch link, that said inter-switch link will shut down in order to cause said other switches to update their forwarding tables.

26. The Fibre Channel switch of claim 21, wherein ensuring that no frames remain queued on the switch comprises waiting for a defined period of time for any queued frames to drain onto the inter-switch link.

27. The Fibre Channel switch of claim 21, wherein the at least one processor is further configured to shut down the inter-switch link after ensuring that no frames remain queued on the switch for transmission on the inter-switch link.

28. The Fibre Channel switch of claim 21, wherein sending a communication to the second switch comprises communicating using an EPP protocol.

29. The Fibre Channel switch of claim 21, wherein sending a communication to the second switch comprises communicating using a protocol other than EPP.

30. A line card operable for use in a Fibre Channel switch, the line card comprising:
an interface for communicating with a Fibre Channel switch;
a port for connecting to an inter-switch link with a second Fibre Channel switch; and
at least one processor configured to do the following:
determine that the inter-switch link is to be shut down;
modify forwarding parameters to ensure that no further frames are forwarded from the switch onto the inter-switch link and sending one or more communications to the second Fibre Channel switch;
send a communication to the second switch informing it that the inter-switch link is to be shut down, wherein the communication comprises an indication that forwarding parameters in the second Fibre Channel switch be modified to ensure that no frames are forwarded from the second Fibre Channel switch onto the inter-switch link;
ensure that no frames remain queued on the switch for transmission on the inter- switch link;
receive confirmation from the second Fibre Channel switch that it is prepared for the inter-switch link to shut down; and
shut down the inter-switch link.

31. The line card of claim 30, wherein the at least one processor is further configured to abort and/or complete at least one pending change for the inter-switch link.

32. The line card of claim 30, wherein modifying the forwarding parameters comprises updating a forwarding table on said switch.

33. The line card of claim 32, wherein modifying said forwarding parameters further comprises informing other switches on a network fabric including said switch, but not via the inter-switch link, that said inter-switch link will shut down in order to cause said other switches to update their forwarding tables.

34. The line card of claim 30, wherein ensuring that no frames remain queued on the switch comprises waiting for a defined period of time for any queued frames to drain onto the inter-switch link.

35. The line card of claim 30, wherein the at least one processor is further configured to shut down the inter-switch link after ensuring that no frames remain queued on the switch for transmission on the inter-switch link.

36. The line card of claim 30 wherein sending a communication to the second switch comprises communicating using an EPP protocol.

37. The line card of claim 30, wherein sending a communication to the second switch comprises communicating using a protocol other than EPP.

* * * * *